United States Patent [19]
Tacke et al.

[11] 3,819,245
[45] June 25, 1974

[54] BASE FOR CABINET OR THE LIKE

[75] Inventors: William H. Tacke, Wyoming; Robert B. Ormiston; Lonnie L. McCrackin, both of Grandville, all of Mich.

[73] Assignee: Steelcase Inc., Grand Rapids, Mich.

[22] Filed: June 2, 1972

[21] Appl. No.: 259,100

[52] U.S. Cl............. 312/253, 312/223, 312/257 A
[51] Int. Cl.. A47b 91/00, A47b 77/08, A47b 43/00
[58] Field of Search .......... 312/253, 254, 263, 204, 312/205, 111, 140; 248/181.1; 52/99-98, 221

[56] References Cited
UNITED STATES PATENTS

| | | | |
|---|---|---|---|
| 687,740 | 12/1901 | French | 312/108 |
| 2,064,513 | 12/1936 | Andrews | 312/7 R |
| 2,233,480 | 3/1941 | Jonas | 312/111 X |
| 2,295,915 | 9/1942 | Ring | 312/257 SK |
| 2,306,209 | 12/1942 | Elofson et al. | 312/223 X |
| 2,460,469 | 2/1949 | Rifkin et al. | 312/223 UX |
| 2,476,896 | 7/1949 | Myhre et al. | 312/228 X |
| 2,658,101 | 11/1953 | Coxe | 312/7 R |
| 2,756,369 | 7/1956 | Gorrie | 312/213 X |
| 2,787,382 | 4/1957 | Williams | 312/10 F |
| 3,030,483 | 4/1962 | Rudolph et al. | 312/223 X |
| 3,056,639 | 10/1962 | Caminker et al. | 312/253 X |
| 3,202,468 | 8/1965 | Kegel | 312/223 X |
| 3,635,174 | 1/1972 | Ball et al. | 312/223 |
| R24,009 | 5/1955 | Sitler | 312/111 |

OTHER PUBLICATIONS

Barnes & Son, "American Builder," March 1942, pg. 97.

*Primary Examiner*—Paul R. Gilliam
*Attorney, Agent, or Firm*—Price, Heneveld, Huizenga & Cooper

[57] ABSTRACT

A base for cabinets or the like including inner supporting legs rigidly joined by channel members which are sufficiently wide to define a wiring channel. The base can be aligned with adjacent partitions such that one of its wiring channels is generally continuous with that of the partition. The channel walls include cover supporting flanges spaced outwardly from the inner supporting legs. A cover panel for each side of the base is removably clipped to these cover supporting flanges. Each cover includes a wiring knockout generally in line with a wiring channel. Each panel also includes a small slot knockout through which the joining leg of a joining bracket secured to a channel member can be passed. The joining leg of the joining bracket includes holes therein for cooperating with bolts or the like of an adjacent partition so that the partition can be joined directly to the base.

10 Claims, 6 Drawing Figures

3,819,245

BASE FOR CABINET OR THE LIKE

BACKGROUND OF THE INVENTION

The present invention relates to office furniture such as filing cabinets or the like. It is particularly adapted for use in conjunction with partition systems which facilitate the division of office space. One such partition system is disclosed and claimed in U.S. Pat. application Ser. No. 234,492, filed on Mar. 14, 1972 by Tacke, Ormiston and McKay and assigned to the assignee of the present patent application.

Some partition systems include filing cabinets and the like which are to be hung on the partitions. Freestanding cabinet can also be integrated with a partition system, but only by butting the partitions against the cabinets. Such an arrangement may lead to unsightly gaps as the system is used. It is also likely that the height of the partitions will differ from that of the cabinets. Perhaps more significantly, there is no way to extend wiring from a partition on one side of the freestanding cabinet to a partition on the other except by passing the wiring out of the wiring channel of the partition, around the back of the cabinet and into the wiring channel of the partition on the other side.

In general, there are no means in the prior art for effectively tying conventional freestanding filing cabinets or the like into a space dividing partition system.

SUMMARY OF THE INVENTION

The present invention comprises a base, for filing cabinets or the like, which includes means for tying in wiring from adjacent partitions, or for directly joining adjacent partitions to the base, or both. An inner support means is provided for primarily supporting the weight of the cabinet. An outer support means is provided for supporting cover panels on the base. At least one cover panel includes securing means for cooperating with the outer support means whereby the cover panel is removably secured to the outer support means. The outer support means is spaced from the inner support means a distance sufficient to define a channel therebetween for wiring or the like. Thus, a partition can be positioned adjacent to a cabinet mounted on the wiring base and wiring from the wiring channel of the partition can be passed directly into the wiring channel of the base. The cover panel can be removed to provide access to the base wiring channel to facilitate placement of such wiring. The height of the base can be such that it raises the height of the cabinet to a point equal to that of the partition.

In another aspect of the invention, a flange extends outwardly and generally horizontally from the support means for the cabinet. A joining bracket for joining a partition to the base is secured to the flange. Preferably, the joining bracket includes first and second securing legs projecting laterally from one another generally at right angles and a partition joining leg projecting laterally from the first leg generally at a right angle and generally in line with the second leg. The joining leg includes means facilitating the joining of a partition thereto. Each of the securing legs, on the other hand, include means for cooperating with the flange whereby the joining bracket can be secured thereto with the joining leg projecting in either of two directions away form the base.

Preferably, the wiring channel of the base includes spaced top and bottom walls projecting outwardly from the cabinet support means. The cover panel includes securing means for cooperating with the spaced top and bottom walls to releasably secure the cover panel thereto. In this aspect of the invention, either the top or bottom of the channel walls comprises the abovementioned horizontal flange to which the joining bracket is to be secured.

These and other objects and advantages of the invention will be further appreciated by reference to the written specification and appended drawings.

PREFERRED EMBODIMENT

Figure 1:
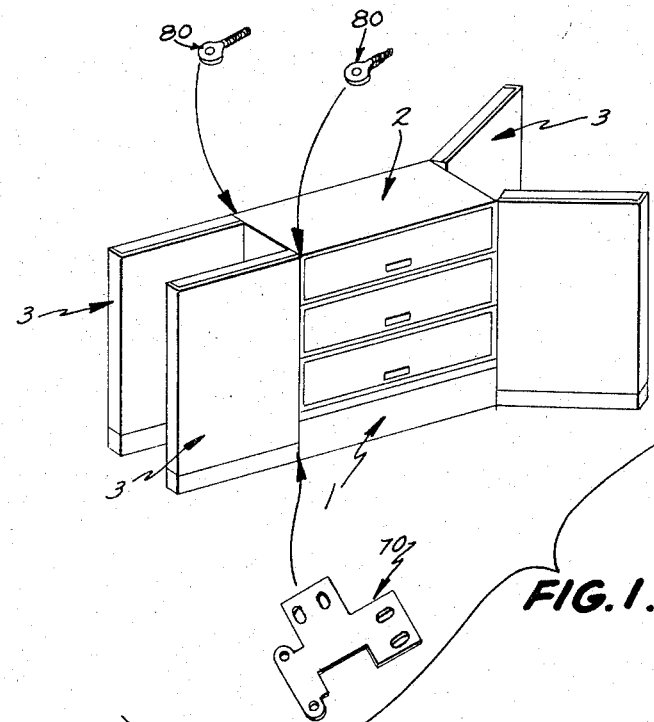
FIG. 1 is a perspective view of a filing cabinet or the like to which a plurality of partitions are joined by means of the joining bracket and wing or eye bolts shown exploded therein
Figure 2:
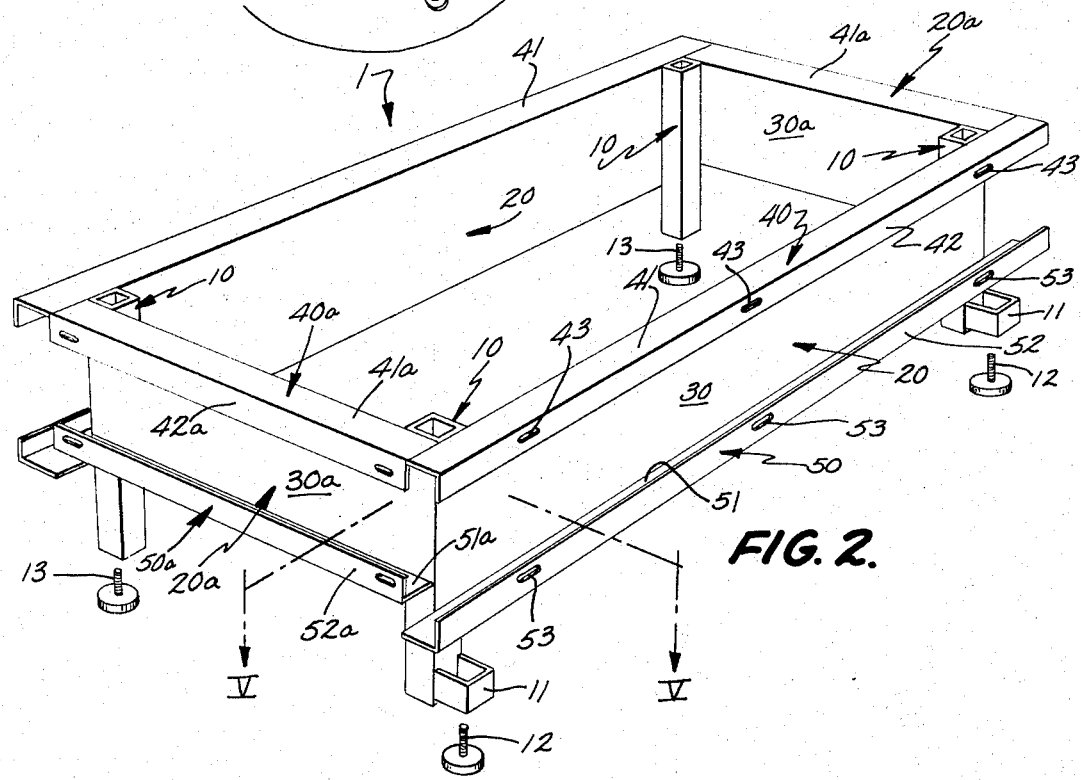
FIG. 2 is a perspective view of the base of this invention with the cover panels removed.
Figure 5:
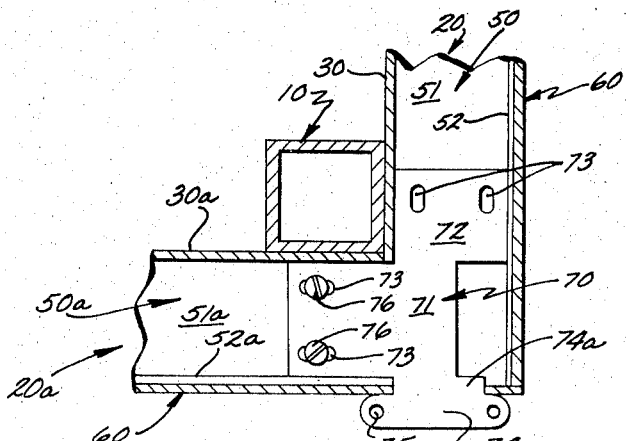
FIG. 5 is a cross-sectional view taken along plane V—V of FIG. 2 with a joining bracket and cover panels being secured to the base.
Figure 6:
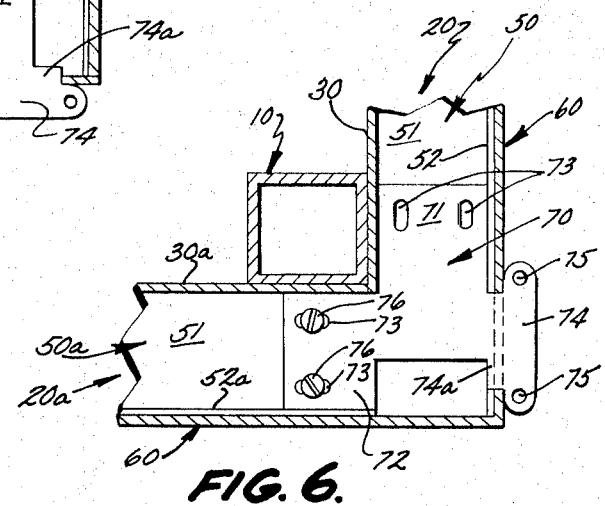
FIG. 6 is the same view as FIG. 5 with the joining bracket being joined in its alternative position.

In the preferred embodiment, base 1 supports a cabinet 2 or the like to which a plurality of partitions 3 can be secured (FIG. 1). Base 1 includes legs 10, which form the primary support for cabinet 2, joined by channel members 20 (FIG. 2). The numbers for end channel members 20 and their components include the suffix "a" to distinguish them from the front and rear channel members 20. Each channel member 20 includes a base wall 30 joining a top wall 40 and a bottom wall 50. Each of the spaced top and bottom walls, 40 and 50 respectively, of channel member 20 include a cover supporting flange, 42 and 52 respectively, for supporting cover panels 60 at a point spaced outwardly from legs 10. This enables wiring or the like to be passed between cover panels 60 and the base wall 30 of wiring channel 20, the base wall 30 being secured directly to legs 10 (FIGS. 2, 5 and 6). A joining bracket 70 (FIG. 1) can be secured to a bottom wall 50a of end channel 20a in one of two ways, to facilitate joining a partition 3 to base 1 either to the side thereof (FIG. 5) or to the rear of front thereof (FIG. 6).

Legs 10 comprise the primary support for cabinet 2 or the like (FIG. 2). They are formed of tubular steel stock or an equivalent material and are preferably generally square in cross section. Legs 10 are joined directly to those channel members 20 which meet at the particular corner at which a leg 10 is located. Channel members 20 provide the only means whereby the separate legs 10 are rigidly interconnected. Specifically, each channel 20 includes a base wall 30 which is welded or otherwise rigidly secured to a pair of legs 10. Each of the front legs 10 include an extension 11 projecting forwardly therefrom, below bottom wall 50 of channel 20, a distance no greater than that which either top wall 40 or bottom wall 50 projects forwardly. The front leveler glides 12 are mounted in extensions 11. Extensions 11 are hidden from view by cover panels 60, but do give better stability to the cabinet when drawers are opened because they carry forward the loading point of the cabinet. Rear leveler glides 13 are inserted directly into rear legs 10.

Each channel member 20 is preferably formed of sheet steel or other equivalent material by bending. (The ensuing description is applicable to end channel members 20a as well, the components being numbered identically with the exception of the letter "a" being added to the numeral designation of end channel 20 components.) Projecting outwardly from base 30 are spaced top and bottom walls 40 and 50 respectively (FIG. 2). Top wall 40 includes a generally vertically oriented cover supporting flange 42 for supporting cover 60. Bottom wall 50 includes a similar cover supporting flange 52. Cover supporting flanges 42 and 52 project inwardly towards one another. Each of the cover supporting flanges 42 and 52 includes a plurality of apertures 43 and 53, respectively, which act as means for cooperating with cover panels 60 to effect the securance of panels 60 thereto.

Cover supporting flanges 42 and 52 constitute an outer support means, spaced outwardly from base wall 30 and legs 10 by means of spacer flanges 41 and 51 of top wall 40 and bottom wall 50 respectively (FIG. 2). Each of the spacer flanges 41 and 51 are sufficiently wide to leave enough space between cover panel 60 and base wall 30 to allow wiring to be passed through channels 20. Bottom spacer flange 51a of each of the bottom walls 50a of end channels 20a also acts as a flange for securing joining bracket 70 to base 1 (FIGS. 5 and 6). The base wall 30a of each of the end channel members 20a is of such a width that bottom wall 50a is positioned at a height appropriate to facilitate the joining of a partition 3 to joining bracket 70. Thus, base walls 30a of the preferred embodiment are actually somewhat shorter in width than base walls 30 of the front and rear channels 20 (FIG. 2).

Figure 3:
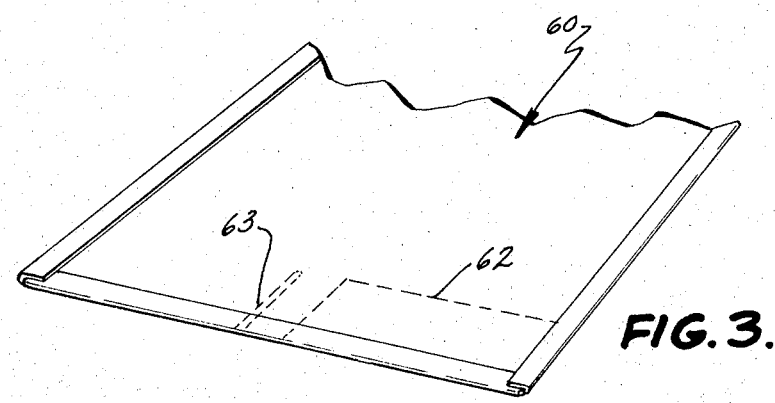
FIG. 3 is a perspective view of one end of a cover panel.
Figure 4:
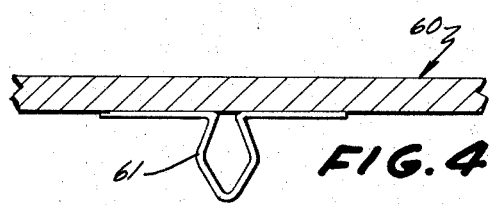
FIG. 4 is a broken cross-sectional view of that portion of a cover panel including a clip for securing to the base.

Cover panels 60 provide a decorative exterior appearance for base 1. Preferably, they comprise a flat sheet of steel or equivalent material (FIG. 3). Each cover panel 60 must be releasably securable to base 1 in order that it might be readily removed to provide access to wiring channels 20. Accordingly, each cover panel 60 includes a clip 61 rigidly secured to the rear face thereof for mating engagement with each of the apertures 43 and 53 in cover securing flanges 42 and 52 respectively (FIG. 4). Clip 61 is specifically constructed to facilitate such securance, having a body which is wider in its middle than at either end and which is slightly compressible such that it can be forced into an aperture 43 or 53 but will expand outwardly again once in place.

Each cover panel 60 also includes appropriate knockout portions for cooperating either with wiring channels 20 or with joining bracket 40 (FIG. 3). In each case, the knockouts are formed by perforating the metal along the desired knockout lines or in some other equivalent manner. Thus, each lower corner of cover panel 60 includes a wiring knockout 62 which can be broken off to thereby leave an opening into a wiring channel 20. Each knockout 62 is generally in alignment with the longitudinal axis of a wiring channel 20.

Similarly, each panel 60 includes a slot knockout 63 which is positioned approximately in line with bottom spacer flange 51a of the end channel members 20a. Slot knockout 63 is sufficiently large that joining bracket 70 can pass therethrough and project outwardly beyond cover panel 60 (FIGS. 5 and 6).

Joining brackets 70 which facilitate joining the partitions 3 to base 1 are stamped with steel or other equivalent material and include a pair of securing legs 71 and 72 for joining to spacer flange 51 and a joining leg 74 for joining to a partition 3 (FIGS. 5 and 6). Securing leg 71 is called lateral securing leg 71 because it extends laterally from joining leg 74, generally at a right angle thereto. Securing leg 72 is referred to as the "aligned" securing leg 72 since it extends laterally from lateral securing leg 71 generally on the same line as joining leg 74. Lateral securing leg 71 and aligned securing leg 72 both include securing holes 73 therein such that either can be secured to the bottom spacer flange 51a by means of screws 76 or the like. If lateral securing leg 71 is secured to bottom spacer flange 51a (FIG. 5), then joining leg 74 will project outwardly from the end of base 1. On the other hand, if aligned securing leg 72 is secured to bottom securing flange 51a, joining leg 74 will project outwardly from the front or rear of base 1 (FIG. 6). In this manner, a partition 3 can be secured to base 1 extending either generally off the end thereof or off the front or rear thereof. When securing leg 71 is secured to bottom spacer flange 51a, aligned securing leg 72 will lie within the front channel 20. When joining bracket 70 is flipped over and aligned securing leg 72 is secured to bottom spacer flange 51a, lateral securing leg 71 will lie within front channel 20.

Joining leg 74 comprises an enlarged head joined to bracket 70 by a narrower stem 74a. It is the narrower stem 74a specifically which passes through the slot left when slot knockout 63 is removed from cover panel 60. The enlarged head of joining leg 74 includes a pair of joining holes 75, one on either side thereof, to facilitate securing a partition 3 thereto. This particular type of joining means, i.e., holes 75, is designed specifically for cooperation with the partition system of patent application Ser. No. 234,492, referred to previously herein at page 1. The partitions of that system are joined to one another by bolts or pins passing through holes in joining links and into nuts at the ends of the partitions themselves. Joining leg 74 replaces a pair of joining links, and the bolts are passed through holes 75 into the receiving nuts. The width of base wall 30a of end channel 20a is specifically designed to place bottom spacer flanges 51a at an appropriate height for joining to such partitions. Such a partition 3 can either be joined by two bolts passing through both holes 75, or can be joined by one bolt passing through one hole 75 and can thereby be pivoted with respect to base 1. A wing bolt 80 as shown in FIG. 1, and as shown and described in said copending application, can be threaded into cabinet 2 itself to facilitate joining the top of partition 3 to cabinet 2.

In operation, a cabinet 2 is secured directly atop base 1 by bolting to top spacer flanges 41 of top walls 40. Such a cabinet 2 and base 1 can be used as a conventional filing cabinet merely by snapping cover panels 60 onto base 1 by means of clips 61 cooperating with apertures 43 and 53 of top and bottom cover panel supporting flanges 42 and 52 respectively. If desired, a partition 3 can be joined to base 1 by securing a joining bracket 70 to a bottom spacer flange 51a of end channel 20a in either of the positions shown in FIGS. 5 and 6. Slot knockout 63 is broken away from cover panel 60 and cover panel 60 is secured to end channel 20a or to front or rear channel 20 with stem 74a of joining leg 74 passing through the open portion. If the partition includes wiring, the wiring is passed directly through base 1 by breaking away wiring knockout 62 which is in line with the end of the particular partition 3. An appropriate cover panel 60 can then be readily removed so that the wiring can be carefully laid in place within the particular wiring channel 20 through which it must pass. With the wiring in place, cover panel 60 is again snapped into place and the entire system has a neat, trim appearance. To fasten top of partition to top of cabinet, wing or eye bolts 80 can be threaded into the upper portions of cabinet 2 to facilitate securing the top of a partition 3 thereto.

Of course, it is understood that the above is merely a preferred embodiment of the invention and that many alterations or modifications can be made of the preferred embodiment without departing from the spirit and broader aspects of the invention.

The embodiments of the invention in which an exclusive property or privilege is claimed are defined as follows:

1. A base for a cabinet or the like comprising:
inner support means for primarily supporting the weight of a cabinet or the like; at least one wiring way secured to said inner support means and opening outwardly with respect to said inner support means whereby said wiring way is readily accessible from the exterior of said base; at least one cover panel; said cover panel and said wiring way including securing means cooperating to removably secure said cover panel to said wiring way whereby said wiring way is normally hidden from view.

2. The base of claim 1 comprising: said base including at least two said wiring ways on adjacent sides of said base and one of said cover panels for each said base; a joining bracket for joining a partition to said base; said cover panel for at least one of said wiring ways including a first knockout portion in alignment with the other of said wiring ways whereby said knockout portion can be removed from said one cover panel to give access to either of said wiring ways; a second knockout portion sufficiently large to allow said joining bracket to extend through said cover panel for joining to said base when said second knockout portion is removed, whereby a partition can be joined to said base and wiring can be passed from said partition to said base.

3. A base for a cabinet or the like comprising:
support means for primarily supporting the weight of a cabinet or the like; at least one wiring channel secured to said support means and opening outwardly whereby said wiring channel is readily accessible from the exterior of said base; said wiring channel having spaced top and bottom walls projecting outwardly from said support means; a cover panel for covering said wiring channel; securing means on said cover panel cooperating with said spaced top and bottom walls to releasably secure said cover panel thereto.

4. The base of claim 3 comprising: one of said wiring channels on each side of said base; one of said cover panels for each of said channels; each of said channels including a base wall joining said spaced and top and bottom walls; said support means comprising a leg at each corner of said base; each said leg being joined to the said base wall of each said channels which meet at said corner; said legs being interconnected to one another only by said base walls.

5. The base of claim 3 comprising: a joining bracket having means for securing said joining bracket to one of said top and bottom channel walls; said joining bracket having means for securing a partition thereto whereby a partition can be joined to said base.

6. The base of claim 5 comprising: said joining bracket including first and second securing legs projecting laterally from one another generally at right angles and a partition joining leg projecting laterally from said first leg generally at a right angle and generally in line with said second leg; said joining leg including means for facilitating joining a partition thereto; each of said first and second securing legs including means for cooperating with said one of said top and bottom channel walls whereby said joining bracket can be secured thereto with said joining leg projecting in either of two directions away from said base.

7. The base of claim 3 comprising: said wiring channel projecting forwardly towards the front of said base; extension means extending forwardly from said support means, beneath said bottom wall of said channel, a distance less than that which said bottom wall projects forwardly, for giving added stability to said base while being hidden from view by said cover panel cooperating with said spaced top and bottom channel walls.

8. A base for a cabinet or the like comprising: support means for primarily supporting the weight of a cabinet or the like; at least one wiring channel on each side of said base opening outwardly whereby said wiring channel is accessible from the exterior of said base; a cover panel means for each said wiring channel for covering said support means, said wiring channels and the interior of said base; each said cover panel means being releasably secured to said base such that it can be readily removed to provide access to each said wiring channel.

9. The base of claim 8 comprising: each of said wiring channels being secured to said support means on the outwardly facing side thereof, whereby said support means do not interfere with access to said wiring channels.

10. The base of claim 8 including at least first and second space divider partitions positioned adjacent first and second corners of said base; each of said space divider partitions including a wiring channel therethrough whereby wiring disposed in said wiring channel of said first partition can extend into a wiring channel of said base at said first corner, on to said second corner and out into said wiring channel of said second partition.

* * * * *